United States Patent [19]

Mase et al.

[11] Patent Number: 5,159,323

[45] Date of Patent: * Oct. 27, 1992

[54] LIQUID CRYSTAL DISPLAY

[75] Inventors: Akira Mase, Atsugi; Shunpei Yamazaki, Tokyo, both of Japan

[73] Assignee: Semiconductor Energy Laboratory Co., Ltd., Kanagawa, Japan

[*] Notice: The portion of the term of this patent subsequent to Oct. 24, 2006 has been disclaimed.

[21] Appl. No.: 361,954

[22] Filed: Jun. 6, 1989

Related U.S. Application Data

[63] Continuation-in-part of Ser. No. 150,150, Jan. 29, 1989, Pat. No. 4,875,378.

[30] Foreign Application Priority Data

Jun. 9, 1988 [JP] Japan .................... 63-143331

[51] Int. Cl.$^5$ ............................... G09G 3/02
[52] U.S. Cl. .......................... 340/712; 340/706; 340/784; 341/33; 341/34
[58] Field of Search ............ 340/712, 706; 341/33, 341/34, 784.1

[56] References Cited

U.S. PATENT DOCUMENTS

| | | | |
|---|---|---|---|
| 4,363,029 | 12/1982 | Pilavin et al. ................ | 340/712 |
| 4,529,968 | 7/1985 | Hilsum et al. ................ | 340/712 |
| 4,839,634 | 6/1989 | More et al. ..................... | 341/33 |
| 4,875,378 | 10/1989 | Yamazaki et al. ............. | 340/712 |

*Primary Examiner*—Ulysses Weldon
*Assistant Examiner*—Regina Liang
*Attorney, Agent, or Firm*—Sixbey, Friedman, Leedom & Ferguson

[57] ABSTRACT

A liquid crystal display is provided having pressure detection ability. An information input can be implemented by directly touching the display which has presented an image. The pressure detection is performed by means of the liquid crystal material which is also provided for use in a displaying operation. In the method of operation, the displaying and pressure operations are carried out alternately.

11 Claims, 3 Drawing Sheets

1st frame 2nd frame 29th frame
pressuer detection frame
1 sec

LIQUID CRYSTAL DISPLAY

This Application is a continuation-in-part of application Ser. No. 150,150 filed Jan. 29, 1989, now U.S. Pat. No. 4,875,378.

BACKGROUND OF THE INVENTION

The present invention relates to a liquid crystal display, and more particularly relates to a display device which is provided with a touch sensor.

There has been developed a liquid crystal display for use in lap-top personal computors or word-processors. For such liquid crystal displays, it will be convenient if the user can input information to the system through the display itself. This input method has already been available in case of CRTs. In the CRT of this type, a certain position is touched with a write pen whose tip is provided with a light sensor. In accordance with the timing of light reception at the tip, the touch position is detected. This structure, however, requires a somewhat complicated circuit increasing the production cost. Furthermore, this is not directly available for liquid crystal displays which utilize no scanning light.

SUMMARY OF THE INVENTION

It is therefore an object of the present invention to provide a liquid crystal display directly on which data inputting can be done.

In order to accomplish the above and other objects and advantages, a ferroelectric liquid crystal is used both as light influencing medium and as a pressure sensor. One cycle of scanning the display area is devoted to pressure detection for each several cycles of displaying frames.

BRIEF DESCRIPTION OF THE DRAWING

This invention can be better understood from the following detailed description when read in conjunction with the drawing in which.

DETAILED DESCRIPTION OF THE PREFERRED EMBODIMENTS

Figure 1:
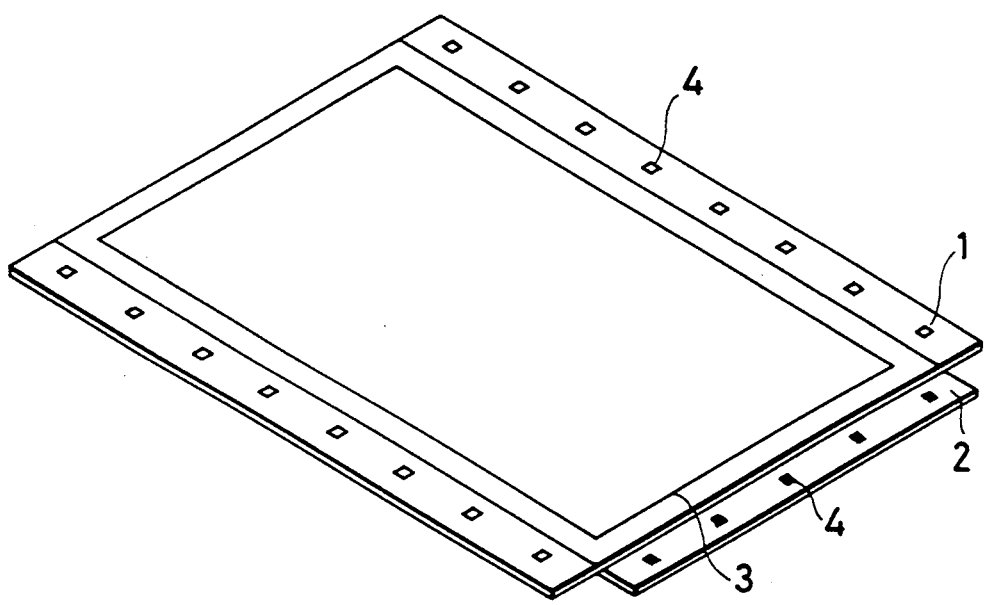
FIG. 1 is a perspective view showing a liquid crystal display in accordance with an embodiment of the present invention.

Referring now to FIG. 1, a perspective view showing a bistable liquid crystal display is illustrated in accordance with an embodiment of the present invention. The display comprises a pair of glass substrates 1 and 2 between which a ferroelectric liquid crystal material is disposed. The substrate 1 has a thickness of 0.5 mm and provides the front surface of the display. The substrate 2 is made of a soda-lime glass pane of a thickness of 1.1 mm and constitutes the supporting structure of the display. The insides surface of the substrates 1 and 2 are formed with parallel electrode strips constituting coloums and rows in a matrix arrangement respectively.

The electrode strips are formed by coating ITO films of 1300 Å on the substrate followed by excimer laser patterning. Peripheral circuits are formed simultaneously as well as contact patterns for making connection with IC chips 4. The inner surface of the substrate 1 is covered with a polyimide film of 200 angstroms thickness over the electrode strips. The polyimide film is thermally annealed for 2 hours at 280° C. in order to be converted to an imide film and given rubbing treatment using a cloth which is characterized by a long soft pile. The inside surface of the other substrate 2 is coated with a $SiO_2$ film of 150 angstroms thickness over the electrode and with an adhesive film pattern surrounding the pattern. After dusting the inside surface of the substrate 2 with spacers of 2.5 diameter $SiO_2$ particles, the two substrates are joined under a pressure of 2 $Kg/cm^2$ at 180° C. for two hours. Then, a ferroelectric liquid crystal material is disposed between the substrates by vacuum injection. Finally, IC chips for signal processing are mounted on and connected with the peripheral circuit.

Figure 3:
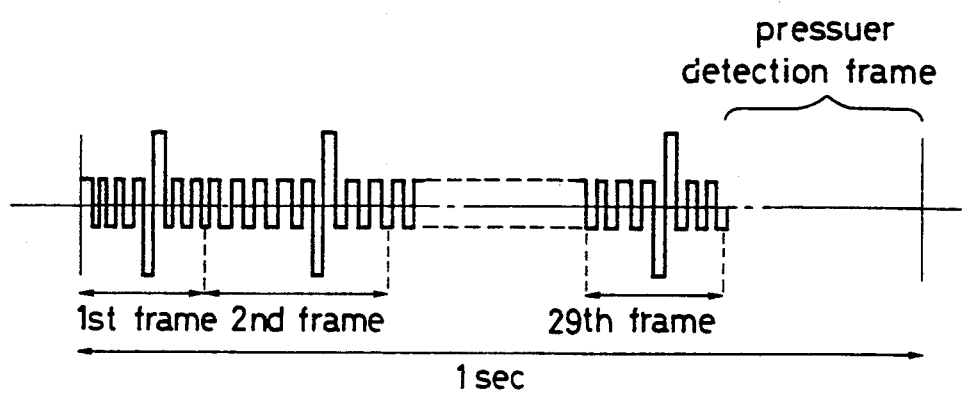
FIG. 3 is a graphical diagram showing a scanning signal for displaying an image on the liquid crystal display.
Figure 2:
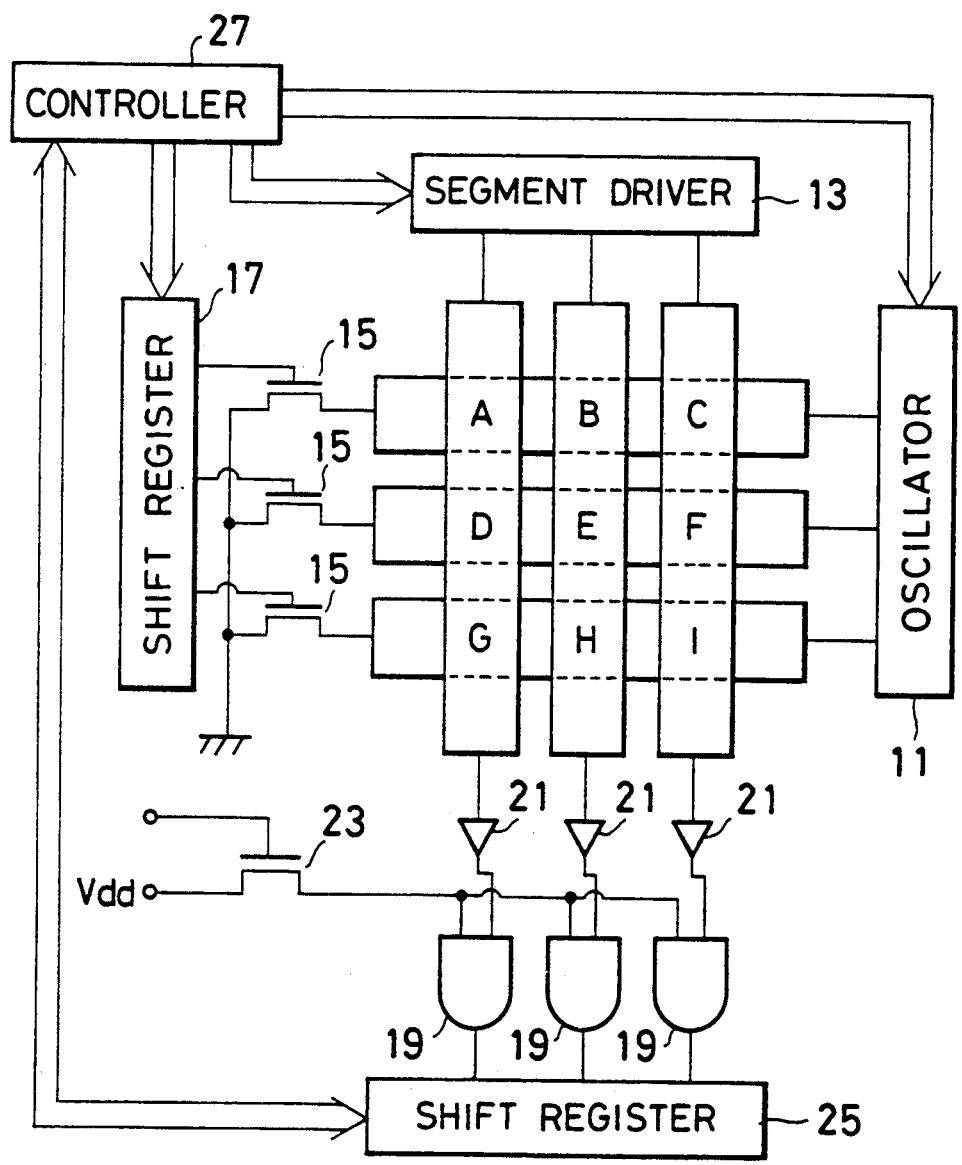
FIG. 2 is a schematic diagram showing a driving circuit of the liquid crystal display illustrated in FIG. 1.

Now, a driving method for the display will be explained. FIG. 2 is a schematic diagram showing the liquid crystal driving system. In the figure, only a 3×3 matrix display is illustrated for the purpose of clarity. In actual configurations, more large scale matrices may be employed. The row strips are connected to a pulse generator 11 which supplies addressing pulsed signals as illustrated in FIG. 3. In synchronization with the addressing signals, the column strips are supplied with data signals from a segment driver 13 in order to display a visual image on the matrix. Each signal is generated by use of a shift register.

Figure 4:
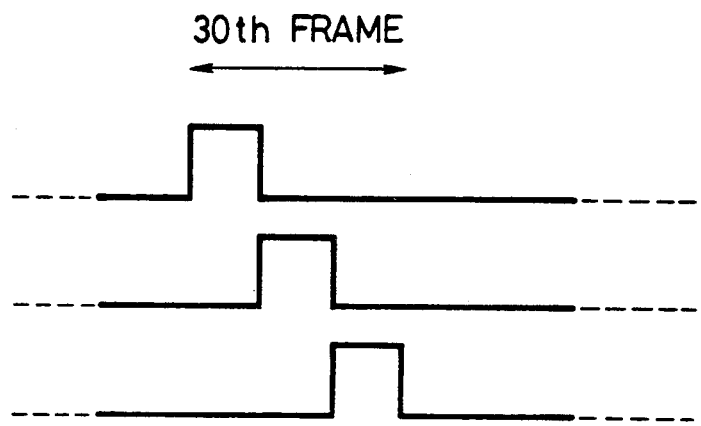
FIG. 4 is a graphical diagram showing control signals given to FETS of the driving circuit.

One frame is constructed during each 1/30 second, i.e. there are 30 scanning cycles within one second. Out of the 30 cycles, the 30th cycle is alloted to a pressure detecting action. The addressing signal and the data signal are kept at a zero level during the 30th cycle as illustrated in FIG. 3. The row strips are connected to the ground terminal through FETs 15 whose gates are supplied with control signals from a shift register 17. The column strips are connected to one input terminals of AND gates 19 through operational amplifiers 21. The other input terminals are connected to a high voltage source Vdd through a FET. The output terminals of the AND gates 19 are coupled to the input terminals of a shift resister 25. During the 30th cycle, the FETs are supplied with control signals as illustrated in FIG. 4 while the AND gates are enabled by inputtig a signal to the gate of the FET 23. By virtue of the control signals, the row strips are grounded successively. Numeral 27 designates a control device which controls each element of the driving circuits for display and pressure detection.

Figure 5:
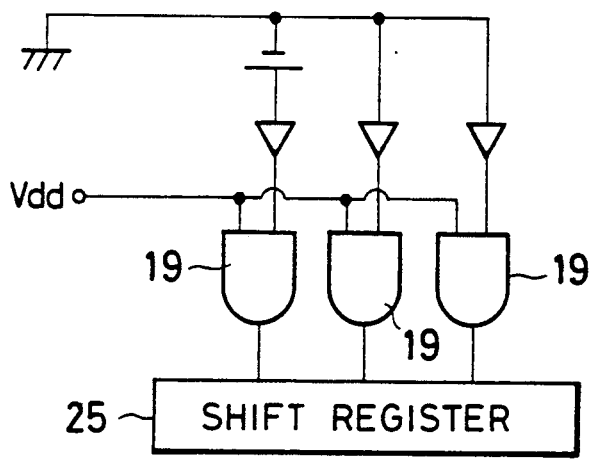
FIG. 5 is a schematic circuit diagram for explanation of the pressure detection by means of the liquid crystal display.
Figure 6:
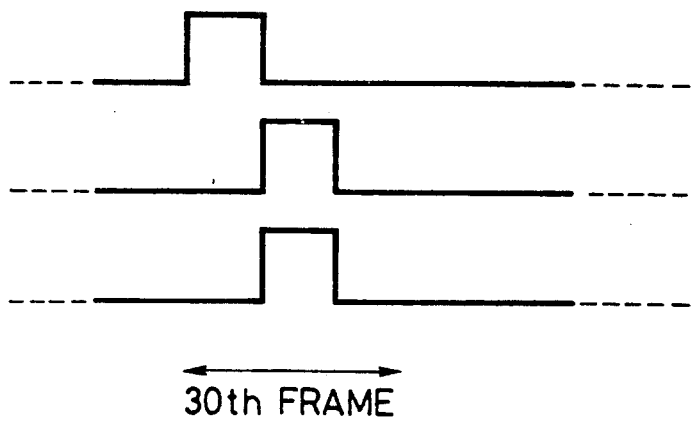
FIG. 6 is a graphical diagram showing an example of signals appearing when several points of the liquid crystal display are pushed.

When the liquid crystal layer between the substrate is pressed at a certain position, a voltage is generated across the liquid crystal layer at the position. In FIG. 5, a schematic diagram is illustrated showing an electric circuit which is realized if position A is pressed. The FET connected to the first row is turned on during the first third of the detecting period. The shift register receives the data of the first row as (100) in synchronization with the turning on of the FET. The data is taken out from the shift register by shifing action. A signal timing chart of gate control signals input to the FETs and data input to the shift register when positions A, E and H are pushed is illustrated in FIG. 6.

While several embodiments have been specifically described by way of examples, it is to be appreciated that the present invention is not limited to the particular examples described and that modifications and variations can be made without departing from the scope of the invention as defined by the appended claims.

What is claimed is:

1. A liquid crystal display comprising:
    a pair of substrates at least one of which is transparent;
    an electrode arrangement formed on the inside surfaces of said substrates in order to define a plurality of pixels;
    a liquid crystal material having a piezoelectric effect disposed between said substrates;
    a means for supplying driving signals to said electrode arrangement in order to construct an image on said display;
    a means for detecting the voltage generated across said liquid crystal material between said substrates due to pressure applied thereto; and
    a means for controlling said driving means and detecting means in order that the displaying operation by means of said supplying means and the detection operation by means of said detecting means are performed alternately.

2. The display of claim 1 wherein said electrode arrangement comprises a plurality of first parallel conductive strips formed on one of said substrates and a plurality of second parallel conductive strips, said first and second strips being arranged orthogonally in order to form a matrix.

3. The display of claim 2 wherein said supplying means comprising an oscillator which supplies addressing signals to said first strips and a driver which supplies input signals to said second strips in synchronization with said addressing signals.

4. The display of claim 3 wherein said detecting means comprises a switching circuit which sequentially grounds one of said first strips whereas the others of said first strips are opened, and a shift register which stores the voltage levels of said second strips in synchronization with said switching circuit.

5. The display of claim 1 wherein the pressure detection operation scanning through the display area is effected after the display operation of several frames.

6. The display of claim 1 wherein said electrode arrangement is scanned with said driving signals n times (where n>2) and subsequently scanned with voltage detection signals one time.

7. The display of claim 1 wherein said liquid crystal material comprises a ferroelectric liquid crystal.

8. A method for operating a liquid crystal display device comprising a pair of substrates with a gap therebetween filled with a liquid crystal layer having a piezoelectric effect and an electrode arrangement defining a plurality of picture elements in said liquid crystal layer, said method comprising the steps of:
    first scanning said picture elements with signals for displaying a visual image in said device;
    second scanning said picture elements with signals subsequent to said first scanning for sensing a voltage generated by said liquid crystal layer at each picture element in response to a pressure applied thereto; and
    repeating said first and second scanning steps.

9. The method of claim 8 wherein said liquid crystal layer comprises a ferroelectric liquid crystal layer.

10. A liquid crystal device comprising:
    a pair of substrates, at least one of which is transparent, each having an inside and an outside;
    row and column electrode strips respectively formed on the insides of said substrates;
    a liquid crystal layer having a piezoelectric effect disposed between said substrates;
    means for scanning said row electrode strips with address signals;
    means for supplying said column electrode strips with data signals in synchronization with said address signals;
    means for detecting a voltage generated across said liquid crystal layer in response to a pressure applied thereto, said means comprising a means for scanning said row electrode strips with ground level signals, a plurality of AND gates where each of said column electrode strips is connected to one of two inputs of said AND gates respectively, a means for applying a voltage to the other one of said two inputs of said AND gates and a means for detecting outputs of said AND gates; and
    a controller for driving said means for scanning said row electrode strips, said means for supplying said column electrode strips and said means for detecting a voltage in order that a display operation and a pressure detection of said liquid crystal device are performed alternatively.

11. The device of claim 10 wherein said liquid crystal layer comprises a ferroelectric liquid crystal.

* * * * *